T. W. VARLEY & W. C. NEIN.
AUTOMATIC TRAIN CONTROL.
APPLICATION FILED AUG. 19, 1916.
1,261,981.
Patented Apr. 9, 1918.
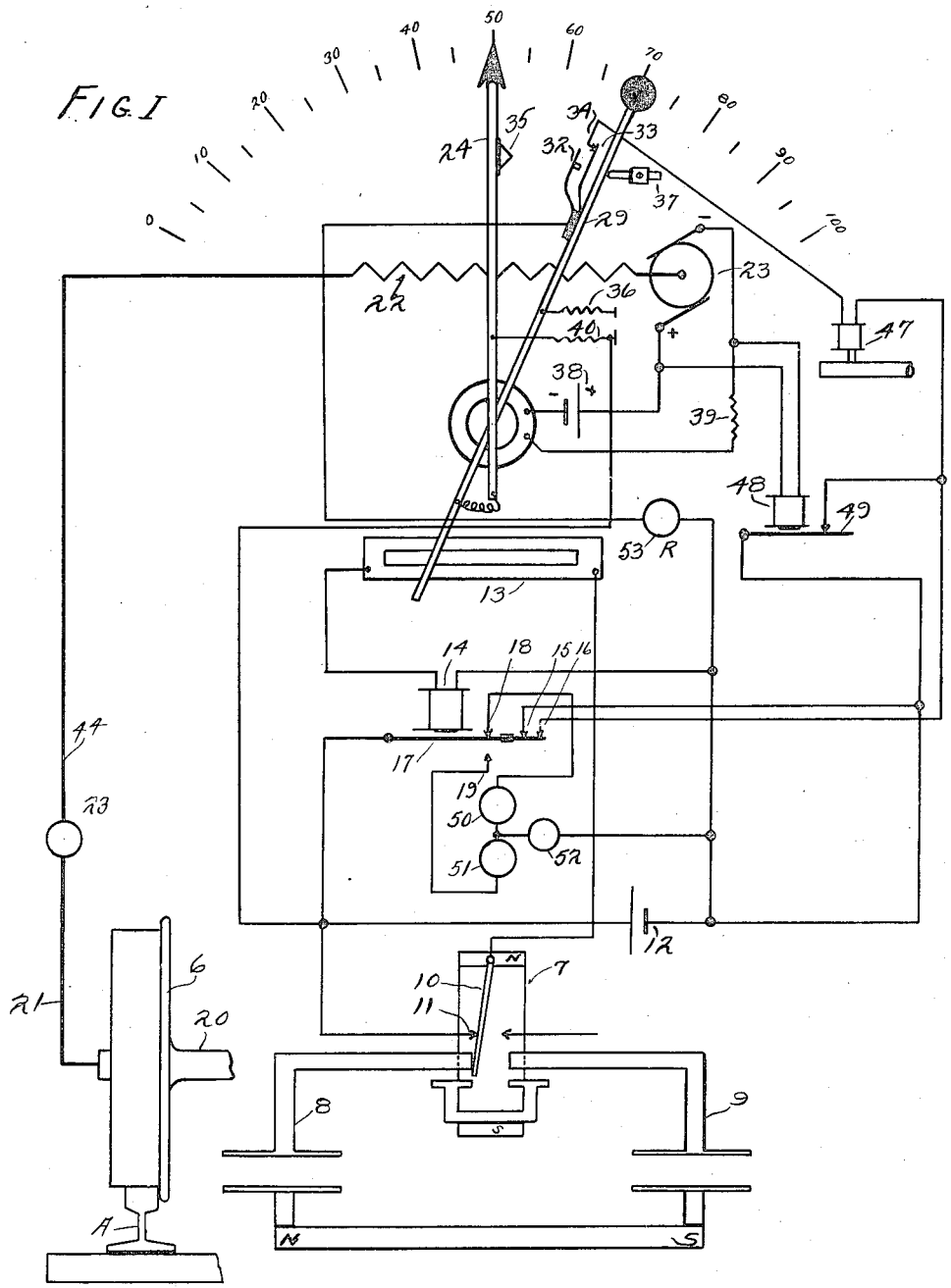
FIG. I
INVENTORS
Thomas W. Varley
William C. Nein

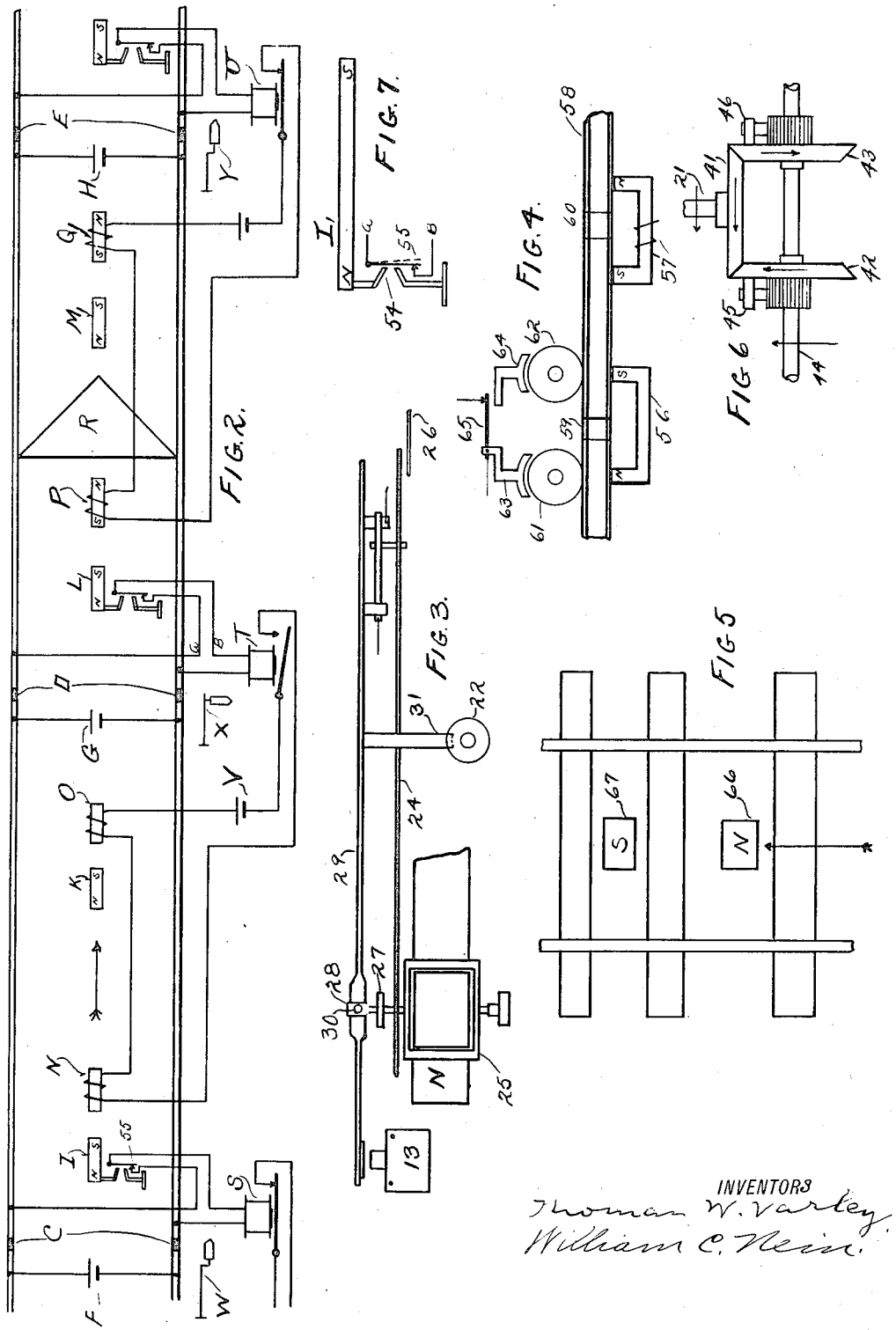

UNITED STATES PATENT OFFICE.

THOMAS W. VARLEY AND WILLIAM C. NEIN, OF NEW YORK, N. Y.

AUTOMATIC TRAIN CONTROL.

1,261,981.  Specification of Letters Patent.  Patented Apr. 9, 1918.

Application filed August 19, 1916. Serial No. 115,811.

*To all whom it may concern:*

Be it known that we, THOMAS W. VARLEY and WILLIAM C. NEIN, citizens of the United States, residing at New York city, in the county of New York and State of New York, have invented certain new and useful Improvements in Automatic Train Controls, of which the following is a specification.

This invention relates to devices whereby a train or vehicle, upon the occurrence of danger conditions is compelled to be slowed down or stopped. Suitable signals also may be included in the equipment to indicate to the engineer or driver existing conditions.

According to the present invention, the desired control is effected by means of magnets distributed along the track, the fields of which, affect a relay which in turn controls the currents in a train circuit as the train passes the magnets.

The magnets are controlled according to the existing conditions so that the relay and the vehicle circuit current is varied in response to these conditions and the control exerted accordingly.

The magnets along the track may comprise permanent magnets and also electromagnets, the permanent magnets producing danger conditions in the vehicle circuit while the effect of the electro-magnets in association with the permanent magnets is to cause the operations in the vehicle circuit to correspond to existing conditions, the electro-magnets being controllable according to those conditions.

It is the main object of the present invention to enforce a speed control of the vehicle or train in accordance with conditions as impressed upon the track magnets and magnetically transferred to the vehicle circuit.

It is a further object of the invention to provide means for bringing the vehicle or train to a stop in case the engineer or driver does not heed the conditions of the track magnets as magnetically transferred to the vehicle circuit.

A further object of the invention is to provide means for causing the stopping of the train in case of derangement or failure to operate of the controlling apparatus upon the vehicle.

Other and ancillary objects of the invention will appear hereinafter.

In the accompanying drawings, which illustrate the invention,

Figure 1, is a diagram of the vehicle controlling circuits.

Fig. 2, is a diagrammatic showing of the arrangement of track-magnets and circuits.

Fig. 3, is a side elevation showing details, of a speed indicating and controlling apparatus as will be hereinafter referred to.

Fig. 4, is a side elevation of a vehicle truck and track showing a modified arrangement of the relay on the vehicle, and also a modified arrangement of the track-magnets.

Fig. 5, is a diagram showing the track in plan with a modified arrangement of the track magnets.

Fig. 6, shows details of a uni-directional drive.

Fig. 7, shows a permanent magnet and its detecting relay, as used in the track.

Referring to the drawings and first to Figs. 1, 2, 3, 6 and 7. A, indicates one of the rails usual to railroad tracks upon which the vehicle or train runs. The track is divided into blocks, provided with electrical insulation. Across the rails in each block are respectively connected batteries as F, G, and H. Also connected across the rails in each block are respective track relays as S, T, and U. Normally the track relay of a block is energized by a battery and maintains its contacts closed. When, however, the battery is short circuited by a vehicle on the rails within the block the relay will let go and its contacts will open.

The track relay of each block, as T, has its contacts in a circuit including the coils of electromagnets as N and O of the preceding block and a battery as V. So long as the track relay contacts are closed the electro-magnets are energized and are deenergized with the deënergizing of the track relay and opening of its contacts. The track magnets may also be used to operate wayside semaphores as W', X and Y in the well known manner.

Similarly the block succeeding that having electro-magnets N and O, has the electro-magnets F and Q and so on. Each of the electro-magnets is preceded by a permanent magnet as I, K, L, M, &c. Also preceding magnets have their polarities reversed, that is, the south pole 6 of an electro-magnet and the south pole of its preceding magnet are adjacent to one another.

R, represents a vehicle on the track.

The magnetic fields of the permanent and electro-magnets along the track act magnetically upon a polarized relay carried by the vehicle as it passes the magnets whereby to signal the engineer or driver upon the vehicle and to enforce reduction of speed or stoppage of the vehicle under certain conditions of danger as will be hereinafter more fully referred to.

As the vehicle relay, which is a polarized relay, passes through the field of a permanent magnet it will open the vehicle circuit and keep it open. As the vehicle relay passes through the field of the succeeding electro-magnet it will close the vehicle-circuit and keep it closed. This is because the polarity of the electro-magnet is reversed with relation to that of the permanent magnet.

It may be stated here, that the permanent and electro-magnets should be spaced sufficiently far apart so that their fields will not become confused. Otherwise the spacing may be any as desired.

The arrow in Fig. 2, indicates the direction of movement of the vehicle along the track.

Turning now to Fig. 1, the circuits and apparatus may be considered. The usual car-wheel 6, rests upon the rail A. As the polarized relay 7, with its collecting pole pieces 8 and 9, passes through the field of a magnet, the lines of force passing through pole pieces 8 and 9, act upon the tongue 10, of the polarized relay. The tongue 10, and its contact 11, are connected in circuit with a battery 12, relays 13, and 14. The relay 13 controlling the action of a speed arm of a speed controlled device, which will be described later, and relay 14, controlling contacts 15 and 16, in an air valve circuit which will be described later; also the tongue 17, of relay 14, controls two contacts 18, and 19, of a signaling circuit.

From the axle 20, is driven a flexible shaft 21, which drives a worm 22, through a unidirectional transmission device 23, which always drives the worm 22, in the same direction regardless of the direction of rotation of the axle 20 and shaft 21. The worm 22 is connected in driving relation to a generator 23. By thus arranging the generator at the end of the driven part as indicated any break in connections anywhere along the line by which the driven part would fail to operate, would become apparent at once by the failure of the generator 23, to produce voltage. This would result in the application of the brakes and stoppage of the train at the first magnet encountered for reasons as will hereinafter appear.

The apparatus, including the worm 22, (see Fig. 3) comprises a needle 24, fixed to a movable element 25, of a d'Arsonval type of instrument so as to be in reality a volt meter needle. This needle moves over a dial 26, which however, is calibrated to read in speed, such as miles per hour, as such terms express the conditions of prime importance in connection with this application of such apparatus. One end of the movable element of the voltmeter is pivoted in a bridge 27 in the usual manner. Also pivoted in this bridge is bracket 28, carrying a pivoted stop arm 29. The stop arm may thus be turned in planes in right angles with each other. It may be turned about the pivot 30, by means of an electro-magnet 13, which when energized, pulls down upon the tail of the stop arm. Also the stop arm carries a projection 31, adapted to be moved into and out of engagement with the worm 22, as the magnet 13, is deënergized and energized.

The stop arm also carries a combined closing and opening contact device. One part 32, adapted to contact with another part 33, which part 33, is connected with arm 29, a third part 34, being normally in contact with 33. The indicating needle 24, carries a projection 35, adapted to come against contact 32, when they are brought into proximity and press it into contact 33, and upon further pressure to open contacts 33 and 34. The stop arm is drawn to the right (see Fig. 1) by means of a spring 36, which not only retracts the arm along the dial as described, but also tends to hold it in engagement with the worm. The set position of the stop arm is defined by an adjustable stop 37, against the end of which abuts the stop arm 29. The setting of the stop arm 29, controls the distance through which the train may move without being brought to a stop. (Provided the engineer heeds his warnings as a condition of danger is passed). The volt meter having the movable element 25, is connected across the terminals of the generator 23, in series with a battery 38, and a high resistance 39, the voltage of the battery being opposed to that of the generator. The generator, as has been noted, is driven from the vehicle axle so that its electro-motive force is proportional to the speed. The battery 38, is of an electro-motive force such that no speed of the train will cause the electro-motive force of the generator to exceed it. The result is that with no electro-motive force, that of the battery will cause the needle 24, to be thrown to the extreme left hand position against the tension of the spring 40. With the generator in operation the resultant electro-motive force acting upon the voltmeter coil will be reduced equal to that of the battery, minus that of the generator. In other words the torque exerted upon the needle will be reduced by the amount of the generator voltage and will be proportionally drawn to the right by the spring 40. The position of the needle will therefore depend upon the voltage of the generator which is proportional to the vehicle speed. With the vehicle at rest the needle will occupy its extreme left hand position. It will move toward the right proportional to speed of the vehicle and if for any reason the circuits of the battery should be interrupted the spring will immediately move the needle to the right opening the circuit between the contacts 33 and 34 and applying the brakes. The uni-directional driving mechanism may be constructed as shown in Fig. 6. A bevel gear 41, is fixed to the driving shaft 21, and meshes with two bevel gears 42 and 43, mounted loosely on the driven shaft 44, so that they may turn thereon. One of the latter gears always rotates in the desired direction and they are provided with ratchet and pawl connections 45, and 46, each arranged to form driving engagement in the desired direction but the pawl of each slipping over the ratchet teeth on reverse direction.

The apparatus also comprises a normally energized air brake control magnet 47, in circuit with the battery 12, the circuit being controlled by the contacts 33 and 34, as referred to above. A relay 48, connected across the terminals of the generator 23, serves, when energized, to close the circuit to contact 49 of the magnet 47, independently of the contacts 15, and 16, of relay 14. This magnet serves as tell-tale as to whether or not generator 23, is properly generating. If it is not generating the circuit of the air magnet 47 will be opened and the brakes immediately applied when the relay 14 lets go.

The apparatus also comprises visual, clear and danger signals 50 and 51, such as green and yellow lamps and the bell 52, which are controlled by relay 14, as shown in Fig. 1. Also a red lamp 53, controlled by contacts 32 and 33 on stop arm 29, the functions of which will more fully appear from the following considerations of the functions of the apparatus.

Referring to Fig. 2 and Fig. 7, a magnetic detector 54, is shown adjacent to one of the permanent magnets of the track such as I, to control contact 55, in the circuit of track relay S.

The operation may be traced as follows: In the condition as shown in Fig. 1, the stop arm 29, is set at the desired maximum speed, in this case as indicated as 70 miles per hour. The vehicle is in motion just before passing a permanent magnet. As the vehicle passes a permanent magnet the tongue 10, of the polarized relay 7, is thrown over to the right opening the contact 11, which opens the circuit including battery 12, and magnet 13 and relay 14. Relay 14, drops its armature opening contact 18 which is in a circuit including battery 12, green lamp 50 and bell 52; relay 14, also opens contacts 15 and 16 which are in the air valve circuit, these contacts, however, are shunted by contact 49, of relay 48. As the armature of relay 14 drops it closes a contact 19, which is in circuit with battery 12, yellow light 51, and the bell 52, the bell being a single stroke bell operating on the opening and closing of contacts 18 and 19. When the magnet 13 is deënergized, stop arm 29 drops into engagement with the worm 22. Due to the train being in motion worm 22 will cause the stop arm 29, to move toward the left and if allowed to continue until the speed hand 24, is reached, the speed hand will first close contact 32 with 33, which closes a circuit including battery 12, red light 53, stop arm 29, speed hand 24 and control spring 40 of speed hand.

If stop arm 29, is allowed to continue further toward the speed hand 24, then contacts 33, and 34, are opened, these contacts being in a circuit including battery 12, contact 49, air valve 47, stop arm 29, speed hand 24 and spring 40. This opens the air valve circuit and applies the brakes. If however, the engineer lowers the speed of the train so as to keep the speed hand 24, out of the way of stop arm 29, then the stop arm continues its motion to the left and the train is brought to a stop under the control of the engineer. Before the train can proceed the engineer must restore tongue 10, of relay 7, to contact 11, thereby reënergizing magnet 13 and relay 14, which restores stop-arm to its normal position by lifting it out of engagement with worm 22, this being done by spring 36. The air valve 47 is restored automatically when its circuit is closed.

If however, after passing a permanent magnet an energized electro-magnet is passed, polarized relay tongue 10 is restored to its normal position in contact with 11, thus restoring stop arm 29, to its normal position immediately, that is, when a permanent magnet is passed the stop arm 29, starts to move to the left, green light 50 is put out, yellow light 51 is lighted and bell 52 is caused to ring giving an indication to the engineer of having passed a permanent magnet, and when an energized electro-magnet is passed, arm 29 is restored yellow light 51 it put out, green light 50 is lighted and bell 52 is again caused to ring giving an indication to the engineer of having passed an energized electro-magnet or clear signal.

The object of the generator 23 in combination with relay 48 and its armature contact 49, relay 14, and its contacts 15 and 16, speed indicator battery 38 and resistance 39, is to act as a detector of abnormal conditions as follows: Battery 38 holds speed hand 24, at zero speed when train is stationary, however, if this battery circuit is opened the speed hand 24 will travel to the right and open air valve circuit contacts 33 and 34 due to the spring 40, the spring 40 being in this circuit. If the generator fails to generate when the train is in motion relay 48 opens contact 49 and when contacts 15 and 16 of relay 14 are opened the air valve circuit is opened immediately applying the brakes. Thus the mechanical connection between the generator 23 and the axle 20 is insured. Current from battery 38 through resistance 39 is of too small a value to hold up armature of relay 48.

So long as a permanent and energized electro-magnet are successively encountered the engineer may start and stop his engine and control its speed as desired, provided he does not allow the speed to become excessive. As the train starts the generator 23 picks up and lifts armature of relay 48, also it opposes its voltage to that of the battery 38, so that the torque on the hand 24 is reduced and drawn to the right by spring 40.

If the vehicle is passing along a clear block, that is one with no vehicle in the block ahead, it will first encounter the field of a permanent magnet and next of an energized electro-magnet.

If, however, the vehicle is assumed to be entering the block of Fig. 2, just preceding the block containing the vehicle R, it will be seen that a danger condition will exist in the block being entered, the electro-magnets being deënergized. As the vehicle under consideration passes along the block, it will first encounter the field of a permanent magnet, causing an operation as heretofore described as no energized electro-magnet will be passed.

Referring now to Fig. 4, the track magnets 56 and 57 are shown attached to one rail 58 of the track. Non-magnetic sections 59 and 60 are inserted to prevent short-circuiting the magnets. Two wheels 61 and 62 of the vehicle in combination with the collecting poles 63 and 64 form part of the magnetic circuit for relay 65. In other respects the circuits are the same as previously described. In Fig. 5, instead of having the track magnets with both poles arranged as in Fig. 2, they may be arranged perpendicular to the track, the permanent magnet as 66 and the electro-magnet as 67, their polarities being reversed as shown.

Referring again to Fig. 7, the object of the detector 54, with its normally closed contact 55, is to give a danger condition to the track relays S, T, U, &c., in case the permanent magnet lost its magnetism.

While the invention has been illustrated in what is considered its best application together with certain modifications it may be embodied in other structures without departing from its spirit, and is not therefore limited to the structures shown in the drawing.

What we claim is:—

1. The combination with a track, of a vehicle movable along the same, magnets along the track, a polarized relay on said vehicle adapted to be affected magnetically by said magnets, and means controlled jointly by said relay when its contacts are closed and the speed of the vehicle for exerting a controlling influence on the movement of the vehicle.

2. The combination with a track, of a vehicle movable along the same, magnets along the track, a polarized relay on said vehicle adapted to be affected magnetically by said magnets, means set in operation by the opening of said relay tending to influence the movement of the vehicle and means controlled by the speed of the vehicle for preventing the exercise of said influence.

3. The combination with a track, of a vehicle movable along the same, permanent and electro-magnets along said track, a polarized relay on said vehicle adapted to be affected magnetically by said magnets, means tending to exert a certain controlling influence on the movement of said vehicle, said means being adapted to be set in operation by the magnetism from the permanent magnet, the said operation being prevented by the magnetism from the electro-magnet.

4. The combination with a track, of a vehicle movable along the same, permanent and electro-magnet along said track, a polarized relay on said vehicle adapted to be consecutively affected magnetically by said magnets, means tending to exert a certain controlling influence on the movement of said vehicle, said means being adapted to be set in operation by the magnetism from the permanent magnet, the said operation being prevented by the magnetism from the electro-magnet and means for controlling the electro-magnet according to track conditions.

5. The combination with a track, of a vehicle movable along the same, permanent and electro-magnets along said track, a polarized relay on said vehicle adapted to be affected magnetically by said magnets, means controlled jointly by said relay and the speed of the vehicle for exerting a controlling influence on the movement of the vehicle, and means for controlling the electro-magnets according to track conditions.

6. The combination with a track, of a vehicle movable along the same, permanent and electromagnets along the track, a polarized relay on said vehicle adapted to be affected magnetically by said magnets, and a brake circuit controlled jointly by said relay and the speed of the vehicle.

7. The combination with a track, of a vehicle movable along the same, permanent and electro-magnets along said track, a polarized relay on said vehicle adapted to be consecutively affected magnetically by said magnets, a brake circuit, and means controlling said brake circuit set in operation by the magnetism from the permanent magnet, the said operation being prevented by the magnetism from the electro-magnet.

8. The combination with a track, of a vehicle movable along the same, permanent and electromagnets along the track, a polarized relay on said vehicle adapted to be consecutively affected magnetically by said magnets, a brake circuit controlled jointly by said relay and the speed of the vehicle, and means for controlling the electromagnets according to track conditions.

9. The combination with a track, of a vehicle movable along the same, permanent and electromagnets along the track, a polarized relay on said vehicle adapted to be affected magnetically by said magnets, a train of mechanism driven from a moving part of said vehicle for controlling the movement of said vehicle and adapted to be affected in its operation by the action of the relay and means for stopping said vehicle if said mechanism fails to operate.

10. The combination with a track, of a vehicle movable along the same, magnets along said track, a relay on said vehicle adapted to be affected magnetically by said magnets, a stop arm, means driven from a movable part of the vehicle for driving said stop arm, means controlled by said relay for controlling the engagement of said stop arm with its said driving means, a member positioned according to the speed of said vehicle, and a brake circuit controlled by the relative position of said stop arm and member.

11. The combination with a track, permanent magnets along the track, magnetic relays on the track adapted to respond to changes of flux in said magnets.

12. The combination of a track, permanent and electromagnets along the track, relays on the track adapted to respond to changes of flux of the permanent magnets and to alter the flux of the electro-magnets.

13. The combination with a track, of a vehicle movable along the same, permanent and electromagnets along said track, a polarized relay on said vehicle adapted to be affected magnetically by said magnets, a stop arm, means driven from a movable part of the vehicle for driving said stop arm, means controlled by the opening of the relay for affecting the engagement of said stop arm and its driving means, a speed arm and a brake circuit controlled by the relative position of said stop arm and speed arm.

14. In an automatic train control, a track, permanent and electromagnets along said track, a vehicle, a polarized relay on the vehicle adapted to have its circuit influenced to be left open upon passing the permanent magnet and to have its circuit influenced to be left closed upon passing the electro-magnet.

In testimony whereof we affix our signatures.

THOMAS W. VARLEY.
WILLIAM C. NEIN.